United States Patent [19]

Oishi

[11] 3,925,254

[45] Dec. 9, 1975

[54] DEHYDROCYCLIZATION OF HYDROCARBONS

[75] Inventor: Masayoshi Oishi, Wilmington, Del.

[73] Assignee: Sun Ventures, Inc., St. Davids, Pa.

[22] Filed: Sept. 20, 1973

[21] Appl. No.: 399,236

Related U.S. Application Data

[62] Division of Ser. No. 314,207, Dec. 11, 1972, Pat. No. 3,832,414.

[52] U.S. Cl. .............................................. 252/455 Z
[51] Int. Cl.² .......................................... B01J 29/06
[58] Field of Search ............... 252/455 Z; 260/673.5

[56] References Cited
UNITED STATES PATENTS

| | | | |
|---|---|---|---|
| 3,226,339 | 12/1965 | Frilette et al. | 252/455 Z |
| 3,259,564 | 7/1966 | Kimberlin, Jr. | 252/455 Z |
| 3,395,096 | 7/1968 | Gladrow et al. | 252/455 Z |

*Primary Examiner*—Carl F. Dees
*Attorney, Agent, or Firm*—George L. Church; J. Edward Hess; Anthony Potts, Jr.

[57] ABSTRACT

Process of dehydrocyclizing $C_6$–$C_{10}$ hydrocarbons having at least a $C_6$ backbone using a Li, Na or K zeolite X or Y impregnated or ion exchanged with 0.1 to 1.2 weight percent Pt and impregnated or ion exchanged with 0.01 to 1.0 weight percent Cd at from 500 to 560 and preferably 510° to 555°C. using a partial pressure of hydrogen of from 10 to 300 p.s.i. and preferably 40 to 200 p.s.i. to form benzene and alkylbenzene.

4 Claims, No Drawings

DEHYDROCYCLIZATION OF HYDROCARBONS

This is a division of application Ser. No. 314,207, filed Dec. 11, 1972, now U.S. Pat. No. 3,832,414, dated Aug. 27, 1974.

BACKGROUND OF THE INVENTION

In the processing of petroleum into gasoline it is known to remove the normal paraffins from the gasoline due to their very low octane ratings. This operation is conveniently carried out with a molecular sieve absorbant. The normal hydrocarbons thus removed are then processed into more valuable products. One of these processes is reforming the normal paraffins into higher octane gasoline components. In reforming the normal paraffins are isomerized into isoparaffins, dehydrocyclized into aromatics and cracked into lower molecular weight paraffins and olefins. The process of the present invention is directed to maximizing the dehydrocyclizing of the normal paraffins into aromatics.

DESCRIPTION OF THE INVENTION

The present invention relates to the dehydrocyclization of paraffins containing from 6 to 10 carbon atoms to form aromatic compounds.

The catalyst used in the present invention is the lithium, sodium or potassium form of zeolite X or zeolite Y which has been impregnated or ion exchanged with platinum and cadmium. These zeolites are similar in cell size, density, void volume and aperture size. Sodium zeolite X has the typical formula:

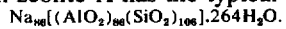

Sodium zeolite Y has the typical formula:

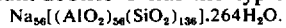

A further description of these zeolites may be found in "Crystalline Molecular Sieves" by D. W. Breck, J. of CHEM. ED., 41, 678-689, 689, (1964). For use in the present invention the exchangeable metal ions portion of the zeolite should be lithium, sodium or potassium. Thus either lithium or potassium may be substituted for part or all of the sodium in the normal synthetic zeolite. These substitutions are well known in the art and generally involve treating the zeolite with an aqueous solution of a salt of the metal which it is desired to substitute on the zeolite.

After the desired zeolite is obtained it is impregnated or ion exchanged with from 0.1 to 1.2 wt. % as based on the zeolite of platinum. Below about 0.1 wt. % platinum the catalyst is not sufficiently active. Above about 1.2 wt. % platinum insufficient improvement in catalyst activity is obtained to warrant the use of more expensive platinum. The zeolite is readily impregnated with platinum by treatment with aqueous chloroplatinic acid at a moderately elevated temperature. In the preferred mode of the invention the platinum is ion exchanged onto the zeolite. This is readily accomplished by treatment of the zeolite with an aqueous solution of both a lithium, sodium or potassium salt of a strong acid and a soluble platinum salt at a moderate temperature for several hours. Generally this treatment is carried out at from 25° to 80°C. for a period of from 1 to 24 hours. The ion exchanged solution generally will contain from $1 \times 10^{-4}$ to 0.1 molar platinum and from 1 to 10 molar sodium. The pH of the ion exchanged solution ordinarily will be from 7 to 9. The catalyst is then washed thoroughly with a solvent such as water to remove the salt residue and is then dried and ground. The catalyst is then calcined by heating at from 400° to 650°C. in an oxygen-containing atmosphere such as air or pure oxygen for from 1 to 6 hours. The platinum is reduced to the free metal by treatment with flowing hydrogen for 1 to 4 hours at 350° to 550°C. The catalyst is then treated with an aqueous solution of a soluble cadmium salt, the anionic portion of which can be volatilized away by heating. Generally only enough water need be present to wet the surface of the zeolite. Generally from 0.1 to 1.2 wt. % as based on the zeolite of cadmium is used. This treatment is normally done at a moderate temperature of from about 25 to 80°C. for from 10 minutes to 4 hours. The catalyst is then dried by heating at 100° to 200°C. for from 1 to 24 hours. The catalyst is then calcined by heating at from 400° to 650°C. in an oxygen containing atmosphere such as air or pure oxygen for from 1 to 6 hours. The platinum and cadmium are then reduced to the free metal by treatment with flowing hydrogen for 1 to 4 hours at 350° to 550°C. This reduction results in the zeolite containing $H^+$ zeolite sites. If desired these $H^+$ zeolite sites can be converted back to alkali metal sites. This is readily done by treatment with 0.1 to 1 N sodium bicarbonate or its equivalent for 1 to 24 hours at 25°-80°C. followed by drying the catalyst.

The dehydrocyclization is generally carried out using a liquid hourly space velocity as based on feed of from 0.1 to 40 and preferably from 2 to 15. The dehydrocyclization is carried out at from 500° to 560°C. and preferably 510° to 555°C. Above 555°C. and especially above 560°C. the amount of cracking taking place starts to increase rapidly. Below about 500°C. the amount of conversion of the paraffin is too low. The amount of cyclization as opposed to the amount of isomerization increases considerably at about 510°C.

The dehydrocyclization is carried out under moderate pressure expressed herein in terms of partial pressure of hydrogen in the reactor. The partial pressure of hydrogen generally is from 10 to 300 p.s.i.g. with from 50 to 200 p.s.i.g. being the preferred range. Below 50 p.s.i.g. and especially below 10 p.s.i.g. coking of the catalyst becomes too rapid to be economical. As the pressure increases above 200 p.s.i.g. and especially above 300 p.s.i.g. the cracking and isomerization reactions become favored instead of the dehydrocyclization reaction.

Suitable paraffinic starting materials contain from 6 to 10 carbon atoms. Generally, the normal paraffins are preferred because due to their low octane numbers, they can be improved more than the branched paraffins which have higher octane numbers. Ordinarily the feed stream will be the normal hydrocarbons removed by denormalization of a $C_6$–$C_{10}$ petroleum stream which would of course consist essentially of $C_6$–$C_{10}$ normal hydrocarbons.

The present invention provides for a high selectivity of the converted material to cyclic hydrocarbons generally in excess of 70 wt. % as based on starting material converted.

DESCRIPTION OF THE PREFERRED EMBODIMENTS

A large quantity such as 100 g. of sodium zeolite X is air dried in an oven overnight at 110°C. A ten gram sample of the dried zeolite X is added to a flask containing 200 ml. of distilled water and 61.4 g. of NaCl. This mixture is stirred for 15 minutes while the temperature is maintained at 60°C. A solution of 0.2 g. of Pt(NH$_3$)$_4$Cl$_2$-H$_2$O in 100 ml. of distilled water is added dropwise to the contents of the flask. The resulting slurry is stirred overnight while being maintained at 60°C. The resulting mixture is filtered and the resulting cake-like catalyst is washed thoroughly until it is substantially free of chlorine. The catalyst is dried for 2 hours at 100°C. in an oven after which it is hand ground until it passes through a No. 40 mesh screen (U.S. Sieve Series). The catalyst is then calcined at 500°C. with 10 cc./min. of air flowing. The final temperature is reached in about two hours. This catalyst is used in Runs 1 and 3 in which runs the catalyst is reduced with hydrogen in the reactor at 500°C. before the runs.

An additional portion of the catalyst is prepared in the same way as described above through the calcining step. The catalyst is then reduced with flowing hydrogen for two hours at 500°C. Three tenths of one percent as based on the catalyst of cadmium in the form of Cd(NO$_3$)$_2$·4H$_2$O was mixed with the catalyst and a small amount of water is added to wet the mixture. The resulting slurry is hand mixed thoroughly for thirty minutes and dried in an oven at 110°C. overnight. The catalyst is then calcined at 500°C. with 10 cc./min. of air flowing. The final temperature is reached in about two hours. This catalyst is used in Runs 2 and 4 in which runs the catalyst is reduced with hydrogen in the reactor at 500°C. before the runs. In Runs 1 to 4 a pulse microreactor is used. This reactor is a stainless steel tube about 200 mm. long and having an inside diameter of 4 mm. The inside of the tube contains pyrex wool retainers which keep the catalyst in place. In each of the runs the tube is packed with 0.125 g. of catalyst. The tube is fitted in a brass mounting sleeve which contains a thermocouple in a well. The brass sleeve in turn is mounted in a four-inch electric furnace operated on 115 volts and controlled by a 7.5 amp powerstat. The top of the tube is fitted with a silicone rubber septum mounted in a septum holder and a carrier gas inlet. The carrier gas is deoxygenated dry hydrogen passed through the system at a rate of about 50 cc. per minute under the pressure indicated in the particular run being reported. The catalyst is preconditioned by injecting a 30 microliter pulse of the n-heptane which is the normal paraffin being dehydrocyclized in all of the runs. The reactor effluent from this pulse is not analyzed. A 2 microliter charge of the n-heptane is then injected through the septum and the resultant effluent is programmed through a previously calibrated gas chromatograph. The definitions of selectivity reported in the table are:

$$\% \text{ cyclization (Cycl)} = \frac{\text{aromatics (wt. \%)} + \text{naphthenes}}{\text{conversion (wt. \%)}} \times 100$$

$$\% \text{ isomerization (Isom)} = \frac{\text{total isomers of 7 carbon atoms (wt. \%)}}{\text{conversion (wt. \%)}} \times 100$$

$$\% \text{ cracking (Crack)} = \frac{\text{total of 6 and lower carbon atoms (wt. \%)}}{\text{conversion (wt. \%)}} \times 100$$

It is apparent from an inspection of the table that Runs 2 and 4 which use the cadmium doped catalyst are clearly superior in achieving the desired result.

TABLE

| Run | Temp., °C. | H$_2$ Press. p.s.i.g. | Conversion % | Selectivity (%) Cycl | Isom | Crack | Cycl/Crack |
|---|---|---|---|---|---|---|---|
| 1 | 500 | 50 | 45.3 | 46.4 | 28.0 | 25.6 | 1.81 |
| 2 | 500 | 50 | 52.5 | 70.4 | 14.9 | 14.7 | 4.79 |
| 3 | 520 | 50 | 80.6 | 60.5 | 14.2 | 25.3 | 2.39 |
| 4 | 520 | 50 | 87.7 | 78.3 | 7.3 | 14.5 | 5.40 |

What is claimed is:

1. A process of preparing a catalyst comprising treating an alkali metal zeolite X or zeolite Y wherein the alkali metal is lithium, sodium or potassium with dilute aqueous solution of an alkali metal salt of a strong acid which is lithium salt, sodium salt or potassium salt and a platinum salt at from 25° to 80°C. to ion exchange from 0.1 to 1.2 weight percent as based on said zeolite of platinum ions for the alkali metal ions of said zeolite, washing the ion exchanged zeolite with water, calcining the zeolite at from 400° to 650°C. in an oxygen containing atmosphere for from about 1 to about 6 hours, reducing the platinum to a free metal state with flowing hydrogen at from 350° to 550°C., applying from 0.1 to 1.2 weight percent dadmium in the form of a cadmium salt and sufficient water to wet the surface of the zeolite to impregnate cadmium on said zeolite, drying said zeolite, calcining the cadmium and platinum containing zeolite at from 400° to 650°C. in an oxygen containing atmosphere for from about 1 to about 6 hours, reducing the platinum and cadmium in the thus calcined zeolite to the free metal state with flowing hydrogen at from 350° to 550°C.

2. The process of claim 1 wherein the ion exchange solution contains from $1 \times 10^{-4}$ to 0.1 molar platinum and from 1 to 10 molar alkali metal and has a pH of from 7 to 9.

3. The process of claim 2 wherein the zeolite is zeolite X.

4. The process of claim 3 wherein the zeolite X is sodium zeolite X and the alkali metal salt used in the ion exchange step is a sodium salt.

* * * * *